(12) United States Patent
Miller et al.

(10) Patent No.: US 10,174,772 B2
(45) Date of Patent: Jan. 8, 2019

(54) DEVICE AND METHOD FOR CONTROLLING FLUID FLOW OVER AN OPTICAL INSTRUMENT

(71) Applicant: RAYTHEON COMPANY, Waltham, MA (US)

(72) Inventors: Kirk A. Miller, Dallas, TX (US); Mauricio A. Salinas, McKinney, TX (US); Dustin Hamill, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 133 days.

(21) Appl. No.: 15/381,166

(22) Filed: Dec. 16, 2016

(65) Prior Publication Data

US 2018/0172040 A1    Jun. 21, 2018

(51) Int. Cl.
| F15B 21/00 | (2006.01) |
| F15D 1/00 | (2006.01) |
| F15D 1/12 | (2006.01) |
| B64D 47/08 | (2006.01) |
| B64C 1/14 | (2006.01) |
| B64C 1/36 | (2006.01) |
| B64C 7/00 | (2006.01) |

(Continued)

(52) U.S. Cl.
CPC ............ *F15D 1/003* (2013.01); *B64C 1/1492* (2013.01); *B64C 1/36* (2013.01); *B64C 7/00* (2013.01); *B64C 23/06* (2013.01); *B64D 7/00* (2013.01); *B64D 47/08* (2013.01); *F15D 1/12* (2013.01)

(58) Field of Classification Search
CPC .......... F15D 1/003; F15D 1/12; F15D 1/0085; B64C 1/0009; B64C 7/00; B64C 21/00; B64C 23/06; B64D 43/00; Y10T 137/2088; Y10T 137/2224
USPC .............. 137/807, 833; 244/129.4, 3.16, 132
See application file for complete search history.

(56) References Cited

U.S. PATENT DOCUMENTS

| 4,155,521 A * | 5/1979 | Evans .................. F41G 7/2213 |
| | | 244/3.16 |
| 4,677,288 A * | 6/1987 | Smith ..................... F41G 3/326 |
| | | 244/3.16 |

(Continued)

FOREIGN PATENT DOCUMENTS

| EP | 2338788 A1 | 6/2011 |
| EP | 2927114 A1 | 10/2015 |
| FR | 2875785 A1 | 3/2006 |

OTHER PUBLICATIONS

International Search Report and Written Opinion for application No. PCT/US2017/042717 dated Oct. 26, 2017.

*Primary Examiner* — Minh Le
(74) *Attorney, Agent, or Firm* — Lando & Anastasi, LLP (57) ABSTRACT

A device is provided for controlling fluid flow over a window of a movable optical instrument housing. The device includes a generally annular body having an inner peripheral edge configured to correspond to a peripheral edge of the window of the housing and an outer peripheral edge, an arcuate outer surface disposed between the inner peripheral edge and the outer peripheral edge, and a reduced width portion between the inner peripheral edge and the outer peripheral edge. The reduced width portion is configured to lower elevation torque. Other embodiments of the device and methods for controlling fluid flow are further disclosed.

16 Claims, 9 Drawing Sheets

(51) Int. Cl.
*B64C 23/06* (2006.01)
*B64D 7/00* (2006.01)

(56) References Cited

U.S. PATENT DOCUMENTS

| | | | | |
|---|---|---|---|---|
| 5,069,397 | A * | 12/1991 | Haslund | B64C 21/04 244/1 R |
| 5,775,643 | A * | 7/1998 | McMaster | F41G 7/2293 244/1 R |
| 5,806,789 | A | 9/1998 | Boulware et al. | |
| 7,661,890 | B2 * | 2/2010 | Basho | G03B 27/58 348/143 |
| 7,815,150 | B2 * | 10/2010 | Vassberg | B64C 23/00 244/199.1 |
| 8,376,280 | B1 * | 2/2013 | Gendron | B64C 7/00 244/1 R |
| 8,635,938 | B2 * | 1/2014 | King | F41H 13/005 244/130 |
| 8,654,314 | B2 * | 2/2014 | King | F41H 13/005 250/201.6 |
| 8,870,122 | B2 * | 10/2014 | Ullman | B64C 7/00 244/130 |
| 2015/0251745 | A1 | 9/2015 | Zerweckh et al. | |
| 2015/0307202 | A1 * | 10/2015 | Crouch | B64D 43/00 73/147 |
| 2016/0009360 | A1 | 1/2016 | Vasquez et al. | |

* cited by examiner

DEVICE AND METHOD FOR CONTROLLING FLUID FLOW OVER AN OPTICAL INSTRUMENT

FEDERALLY SPONSORED RESEARCH

This invention was made with government support under Grant No. [withheld] awarded by [federal agency withheld]. The U.S. government has certain rights in this invention.

BACKGROUND OF THE INVENTION

Modern tactical aircraft use a number of imaging aids to assist the crew in viewing a scene, selecting targets in the scene, and directing weapons against the selected targets. Visible, infrared, and/or specific spectral bands imaging devices are used in various applications to form an image of the scene. The type of imaging spectrum detected by electromagnetic instruments depends upon the mission, weather conditions, the nature of the scene, as well as other factors.

Issues associated with airflow over electromagnetic instruments are well known. In a particular example, electro-optical and infrared turrets having viewing window diameters of nine inches or greater suffer electro-optical resolution losses over most of the turret's field of regard due to flow turbulence immediately in front of the window at speeds greater than 120 knots. Reference can be made to U.S. Patent Application Publication No. 2015/0251745 A1, which discloses a device secured to a housing of an optical instrument to improve airflow over the optical instrument.

Figure 1:
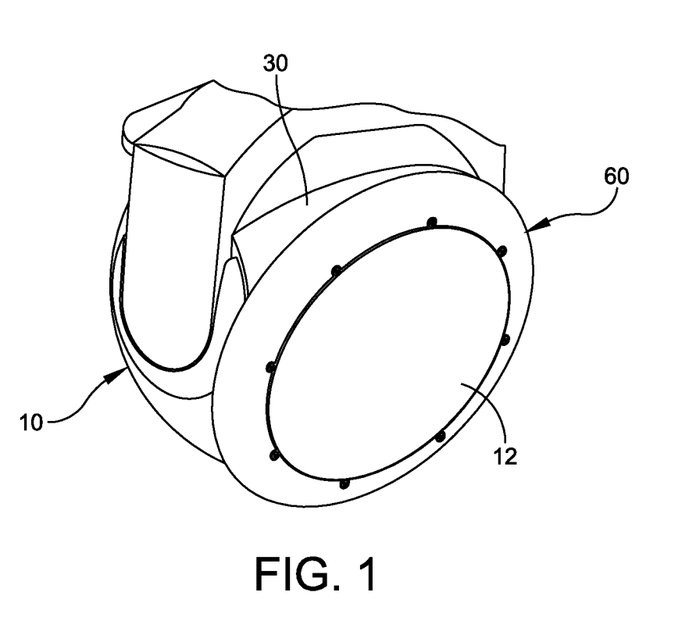
FIG. 1 is a perspective view of another air foil.

FIG. 1 illustrates an annular air foil 60 mounted on the spherical cover 30 of the housing 10 in a position that the air foil surrounds a window 12 to control fluid flow over the window. The air foil 60 includes an annular body having an inner peripheral edge and an outer peripheral edge. The body of the air foil 60 further includes an arcuate outer surface disposed between the inner peripheral edge and the outer peripheral edge. The air foil 60 shown in FIG. 1 embodies a complete air foil. Airborne electro-optical/infrared turrets have been fitted with air foils in order to improve optical performance. However, these air foils generate excessive aerodynamic torque when the turret is looking aft. Aerodynamic torque limits the operational airspeed. The trend is to place these turrets on faster and faster platforms.

SUMMARY OF INVENTION

One aspect of the present disclosure is directed to a device for controlling fluid flow over a window of a movable optical instrument housing. In one embodiment, the device comprises a generally annular body having an inner peripheral edge configured to correspond to a peripheral edge of the window of the housing and an outer peripheral edge, an arcuate outer surface disposed between the inner peripheral edge and the outer peripheral edge, and a reduced width portion between the inner peripheral edge and the outer peripheral edge. The reduced width portion is configured to lower elevation torque.

Embodiments of the device further may include the inner peripheral edge being generally circular in shape and the outer peripheral edge is generally circular in shape. The reduced width portion may include a chord that defines a portion of the outer peripheral edge. The reduced width portion constitutes a first reduced width portion at one side of the body of the device, with the device further including a second reduced width portion at an opposite side of the body of the device. The device may be configured to be rotated with respect to the housing. The device further may include a mechanism configured to rotate the device with respect to the housing. The mechanism may include a motor assembly configured to drive a gear associated with the air foil. The inner peripheral edge may be configured to be substantially flush and contiguous with an outer portion of the window when the device is coupled with the housing.

Another aspect of the disclosure is directed to a device comprising a generally annular body having an inner peripheral edge configured to correspond to a peripheral edge of the window of the housing and an outer peripheral edge, an arcuate outer surface disposed between the inner peripheral edge and the outer peripheral edge, and a movable portion positioned adjacent the outer peripheral edge. The movable portion is configured to move with respect to a remainder of the body.

Embodiments of the device further may include the movable portion being pivotally movable from a first position in which the movable portion forms a contiguous surface with the remainder of the body and a second position in which the movable portion is moved toward the housing. The device further may include a mechanism configured to move the reduced width portion between the first position and the second position. The mechanism may include a motor assembly configured to rotate a crank coupled to the movable portion to drive the pivotal movement of the movable portion.

Yet another aspect of the disclosure is directed to a device comprising a generally annular body having an inner peripheral edge configured to correspond to a peripheral edge of the window of the housing and an outer peripheral edge, an arcuate outer surface disposed between the inner peripheral edge and the outer peripheral edge, and a plurality of slots formed along a portion of a circumference of the body.

One embodiment of the device may include the plurality of slots constituting a first plurality of slots at one side of the body of the device, with the body including a second plurality of slots at an opposite side of the body of the device.

An additional aspect of the disclosure is directed to a method for controlling fluid flow over a window of an optical instrument housing on a vehicle. In one embodiment, the method comprises securing a device around the window of the housing, the device including a generally annular body having an inner peripheral edge configured to correspond to a peripheral edge of the window of the housing and an outer peripheral edge, an arcuate outer surface disposed between the inner peripheral edge and the outer peripheral edge, and a reduced width portion between the inner peripheral edge and the outer peripheral edge, the reduced width portion being configured to lower elevation torque.

Embodiments of the method further may include the reduced width portion constituting a first reduced width portion at one side of the device, with the device further including a second reduced width portion between the inner peripheral edge and the outer peripheral edge at an opposite side of the device. The method further may include rotating the device with respect to the housing.

Another aspect of the disclosure is directed to a method comprising: securing a device around the window of the housing, the device including a generally annular body having an inner peripheral edge configured to correspond to a peripheral edge of the window of the housing and an outer peripheral edge, an arcuate outer surface disposed between the inner peripheral edge and the outer peripheral edge, and a movable portion positioned adjacent the outer peripheral edge, the movable portion being configured to move with respect to a remainder of the body; and pivotally moving the movable portion from a first position in which the movable portion forms a contiguous surface with the remainder of the body and a second position in which the movable portion is moved toward the housing to reduce aerodynamic torque.

Another aspect of the disclosure is directed to a method comprising: securing a device around the window of the housing, the device including a generally annular body having an inner peripheral edge configured to correspond to a peripheral edge of the window of the housing and an outer peripheral edge, an arcuate outer surface disposed between the inner peripheral edge and the outer peripheral edge, and a plurality of slots formed along a portion of a circumference of the body.

Embodiments of the method further may include the plurality of slots constituting a first plurality of slots at one side of the body of the device, the body including a second plurality of slots at an opposite side of the body of the device. The method may include rotating a mechanism configured to rotate an insert of the device with respect to the housing to open the first plurality of slots and the second plurality of slots.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Embodiments of the present disclosure are directed to a device embodying an air foil that is attached to a window of a turret housing to minimize undesirable density gradients and effectively reduces optical wave front error. In one embodiment, the air foil surrounds the entire window and the radial size of the air foil may be varied around the circumference to reduce aero-torques to the turret housing at some reduction of flow attachment effectiveness. As shown and described with reference to FIG. 1, airborne electro-optical/infrared turrets can be fitted with air foils in order to improve optical performance. However, these air foils generate excessive aerodynamic torque when the turret is looking aft. Aerodynamic torque limits the operational airspeed. The trend is to place these turrets on faster and faster platforms. Embodiments of the air foil of the present disclosure include a truncated reduced width portion design to improve aerodynamic torque when the turret is looking aft. Embodiments further include an air foil having a movable portion and a truncated air foil that can rotate about the window as required to improve optical performance for a wide range of viewing angles, and to minimize aerodynamic torque when looking aft.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
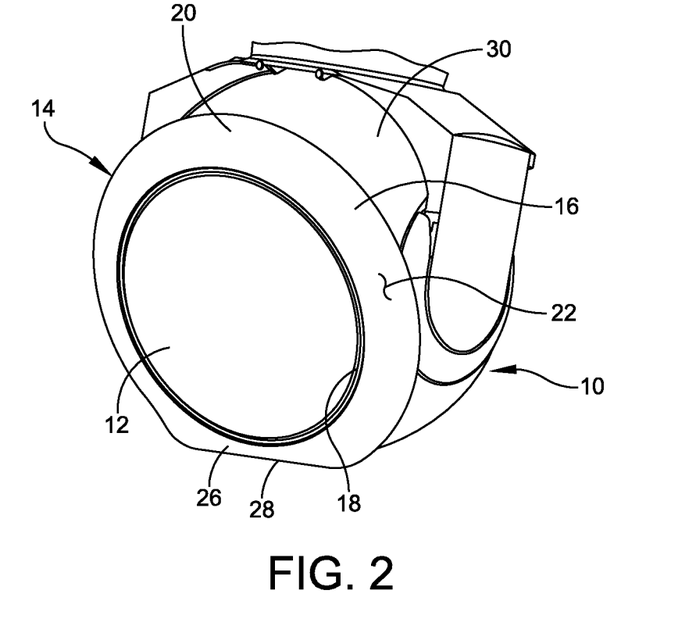
FIG. 2 is a perspective view of an air foil of an embodiment of the present disclosure mounted on a turret.
Figure 3:
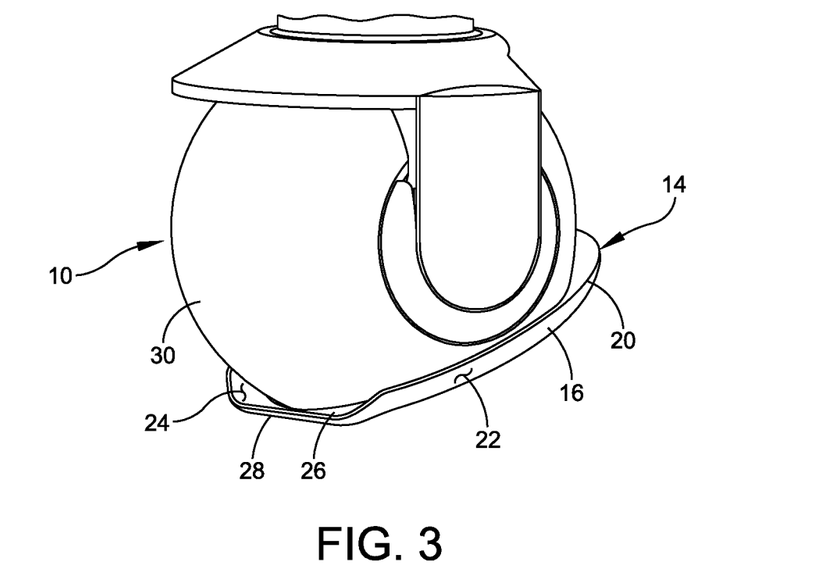
FIG. 3 is another perspective view of the air foil.

Referring to the drawings, and more particularly to FIGS. 2 and 3, an optical instrument housing is generally designated at 10. In one embodiment, the housing 10, which sometimes is referred to as a turret housing, is substantially spherical in construction, and includes a window 12 that is substantially planar. The housing 10 is configured to support an optical instrument, including but not limited to visible, infrared, and/or specific spectral bands imaging devices. For example, the optical instrument may include an optical transmitter and/or receiver, as well as other devices configured to receive and/or transmit various forms of electromagnetic energy, such as optical, visual, infrared (IR), near IR, thermal IR, microwave, and the like. The instrument further may include, but is not limited to, passive sensors, active sensors, imaging sensors, microwave radiometers, synthetic aperture radar (SAR), inverse synthetic aperture radar (ISAR), meteorological radar, forward looking IR, and the like. In some embodiments, the housing 10 embodies a turret housing, which is mounted on the vehicle, such as an aircraft.

As shown, a device embodying an air foil, generally indicated at 14, is mounted on the housing 10 in a position that the air foil 14 surrounds the window 12 to control fluid flow over the window 12. In one embodiment, the air foil 14 includes an annular body 16 having an inner peripheral edge 18 (not shown) configured to correspond to a peripheral edge of the window 12 of the housing 10, and an outer peripheral edge 20. The body 16 of the air foil 14 further includes an arcuate outer, top surface 22 disposed between the inner peripheral edge 18 and the outer peripheral edge 20. The arcuate outer surface 22 and the outer peripheral edge 20 together form a substantially smooth surface. As shown, the inner peripheral edge 18 is rounded, and in a particular embodiment, generally circular in shape. The inner peripheral edge 18 is configured to be substantially flush and contiguous with an outer portion of the body 16 forming the window 12 when the air foil 14 is coupled to the body of the housing 10. Similarly, the outer peripheral edge 20 is generally circular in shape. The air foil 14 further includes an inner, bottom surface 24, with the bottom surface and the arcuate outer surface 22 defining a thickness therein.

The air foil 14 further includes a reduced width portion 26 between the inner peripheral edge 18 and the outer peripheral edge 20. The reduced width portion 26 is configured to lower elevation torque especially when the housing 10 is looking aft. In one embodiment, the reduced width portion 26 includes a chord edge 28 that defines an edge portion of the outer peripheral edge 20. The air foil 14 having the reduced width portion 26 provides approximately 75% of the optical improvement of a full foil while reducing peak aerodynamic torque by nearly 87% than a full sized foil. For example, in one embodiment, an air foil having a reduced width portion reduces aerodynamic torque from 68.6 foot-pounds (ft-lbs) for an air foil having a consistent width to 9.2 ft-lbs when looking aft and exposed to an airflow of 200 knots-indicated air speed (KIAS). This capability will allow for greater operational airspeeds of the vehicle on which the housing 10 and optical instrument are mounted.

Figure 4:
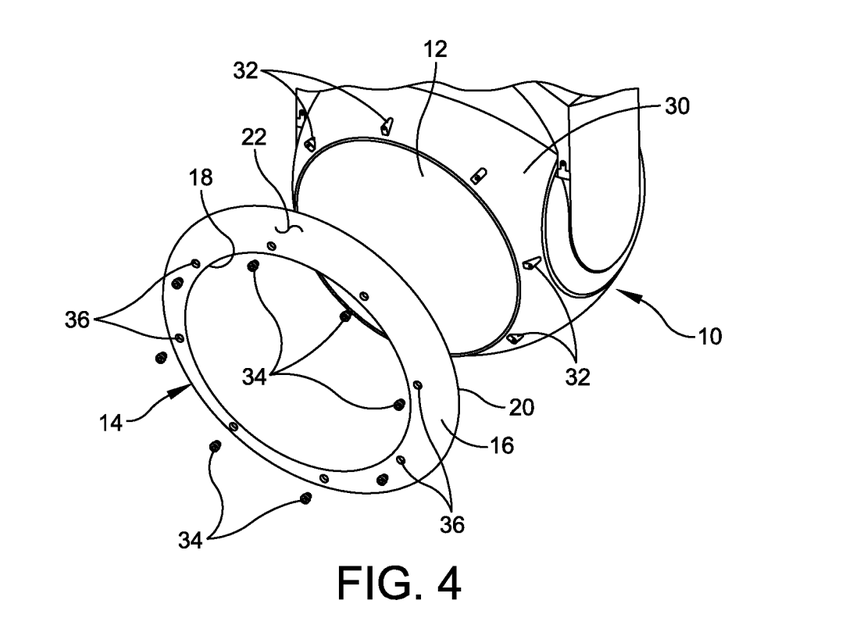
FIG. 4 is an exploded perspective of the air foil and the turret prior to mounting the air foil on the turret.

As shown in FIG. 4, the housing 10 includes a spherical cover 30 (also shown in FIGS. 2 and 3) and several cast mounting features, each indicated at 32, formed on spherical cover. Each mounting feature 32 includes a tapped opening formed therein, the purpose of which will be apparent from the description provided below. In the shown embodiment, there are eight mounting features 32; however, any number of mounting features can be provided to mount the air foil 14 on the spherical cover 30 of the housing 10. The air foil 14 is secured to the spherical cover 30 of the housing 10 by several fasteners, each indicated at 34, which are threadably received in the threaded openings of the mounting features 32. As shown, the fasteners extend through openings, each indicated at 36, formed in the body 16 of the air foil 14. Load spreading washers can be provided to disperse the load of the fastener against the body 16 of the air foil 14.

In some embodiments, the air foil 14 is fabricated from any number of materials. For example, the air foil 14 may be constructed by a 3D printing process, composite lay-up, molded plastic or investment casting. In one embodiment, the thickness between the outer, top surface 22 and the inner, bottom surface 24 is substantially uniform. In another embodiment, the thickness between the outer surface 22 and the inner surface 24 is substantially non-uniform. In a certain embodiment, the air foil 14 includes a seal provided along the inner peripheral edge perimeter 18 to provide a seal between the body 16 of the air foil 14 and the spherical cover 30 of the housing 10.

Figure 5:
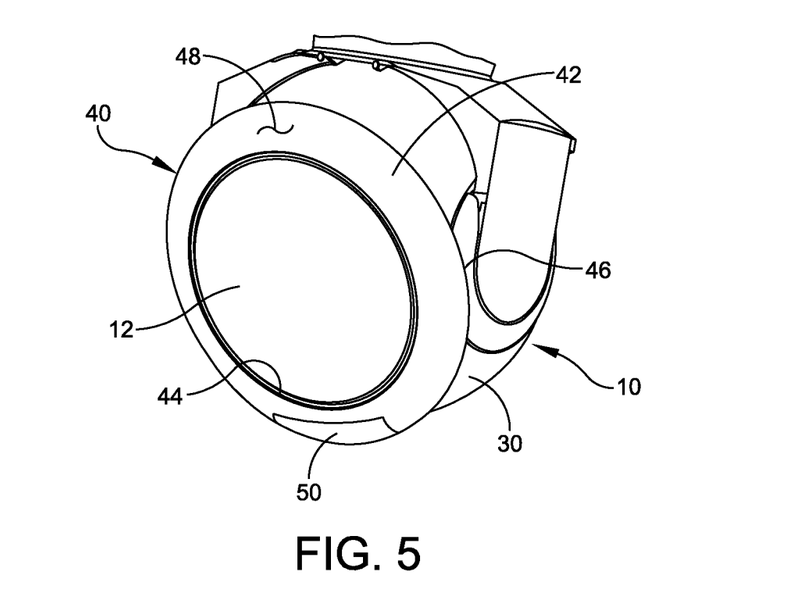
FIG. 5 is a perspective view of an air foil of another embodiment of the present disclosure.
Figure 6:
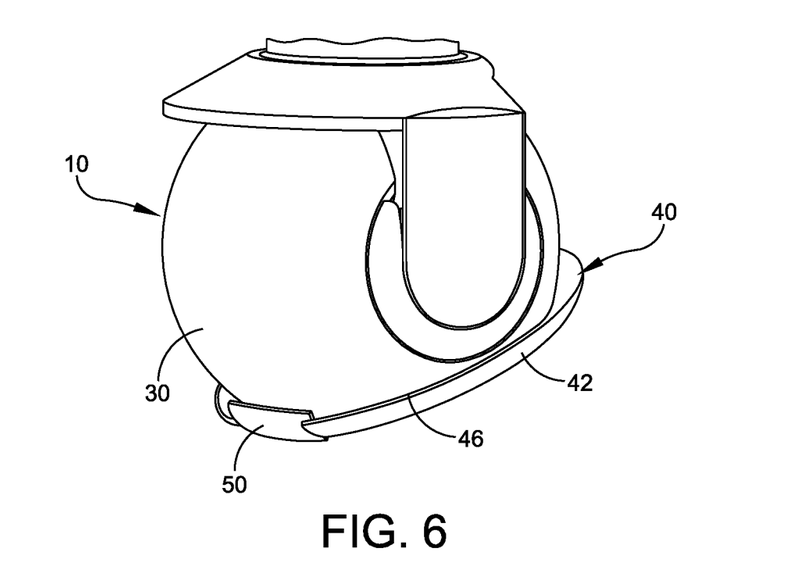
FIG. 6 is another perspective view of the air foil shown in FIG. 5.

Referring to FIGS. 5 and 6, another air foil of embodiments of the present disclosure is generally indicated at 40. As with air foil 14 of FIGS. 2-4, air foil 40 is mounted on the spherical cover 30 of the housing 10 in a position that the air foil 40 surrounds the window 12 to control fluid flow over the window 12. The air foil 40 includes an annular body 42 having an inner peripheral edge 44 and an outer peripheral edge 46. The body 42 of the air foil 40 further includes an arcuate outer surface 48 disposed between the inner peripheral edge 44 and the outer peripheral edge 46. The body 42 of the air foil 40 further includes a movable portion 50 that is separate from the remainder of the body 42 and extends from a position adjacent to the inner peripheral edge 44 to the outer peripheral edge 46. The movable portion 50 is movable, e.g., by pivoting, with respect to a remainder of the body 42 of the air foil 40. Specifically, the movable portion 50 is movable from a first position in which the movable portion forms a contiguous surface with the remainder of the body 42 (FIG. 5) and a second position in which the movable portion is moved toward the spherical cover 30 of the housing 10 (FIG. 6) to form a truncated edge of the body of the air foil. In the first position, the movable portion 50 is positioned to enable full optical performance. In the second position, the movable portion 50 is retracted toward the spherical cover 30 of the housing 10 to lower the elevation torque. The movable portion 50 is particularly configured to lower elevation torque especially when the turret housing 10 is looking aft. In one embodiment, the air foil 40 further includes a mechanism configured to move the movable portion 50 between the first position and the second position.

Figure 7:
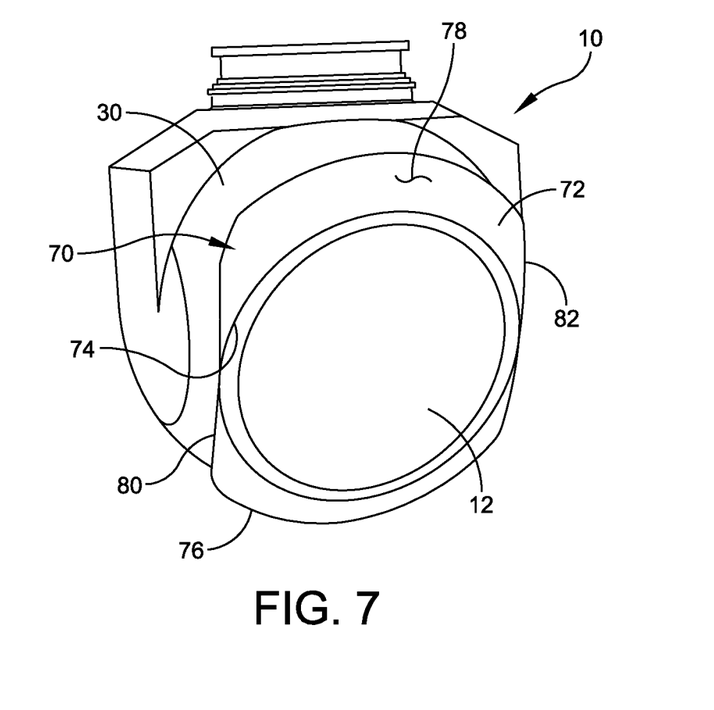
FIG. 7 is a perspective view of an air foil of another embodiment of the present disclosure.

Referring to FIG. 7, another air foil of embodiments of the present disclosure is generally indicated at 70. As with air foils 10, 40 (of FIGS. 2-4 and FIGS. 5 and 6, respectively), air foil 70 is mounted on the spherical cover 30 of the housing 10 in a position that the air foil 70 surrounds the window 12 to control fluid flow over the window. The air foil 70 includes an annular body 72 having an inner peripheral edge 74 and an outer peripheral edge 76. The body 72 of the air foil 70 further includes an arcuate outer surface 78 disposed between the inner peripheral edge 74 and the outer peripheral edge 76. The air foil 70 further includes a first reduced width portion 80 at one side of the body 72 of the air foil 70 and a second reduced width portion 82 at an opposite side of the body of the air foil 70. Although shown to be symmetrical, the body 72 of the air foil 70 can be asymmetrical.

In one embodiment, the air foil 70 is mounted on and configured to be rotated with respect to the spherical cover 30 of the housing 10. Specifically, the truncated air foil 70 can be rotated about the window 12 as required to improve optical performance for a wide range of viewing angles, and to minimize aerodynamic torque when looking aft. In a certain embodiment, the air foil 70 further includes a mechanism configured to rotate the air foil 70 with respect to spherical cover 30 of the housing 10. For example, the air foil 70 can be configured to rotate clockwise, counterclockwise or both to position the truncated portions (first and second reduced width portions 80, 82) to a desired position with respect to the spherical cover 30 of the housing 10.

Figure 8:
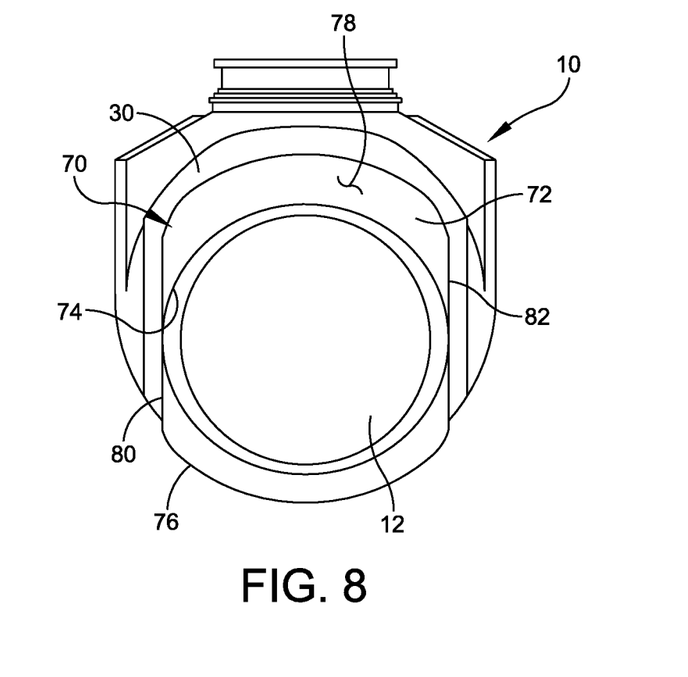
FIG. 8 is a perspective view of the air foil shown in FIG. 7 in a forward facing position.
Figure 9:
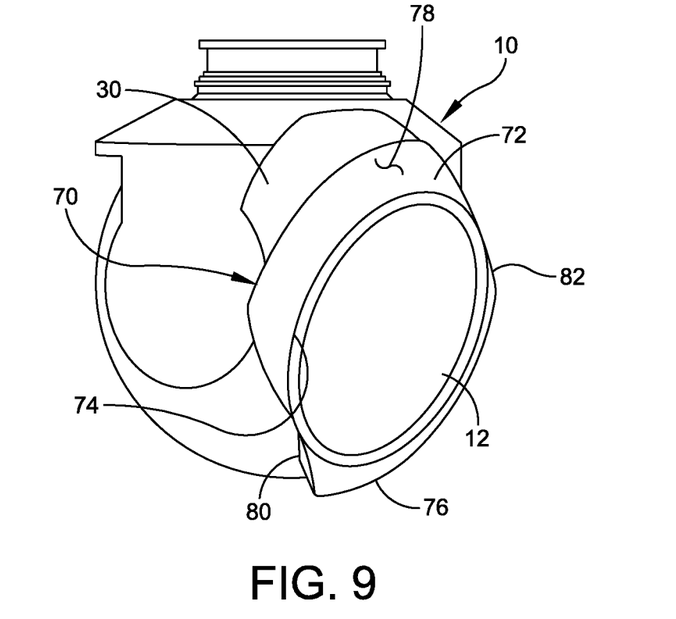
FIG. 9 is a perspective view of the air foil shown in FIGS. 7 and 8 in a partially rotated position (45°)
Figure 10:
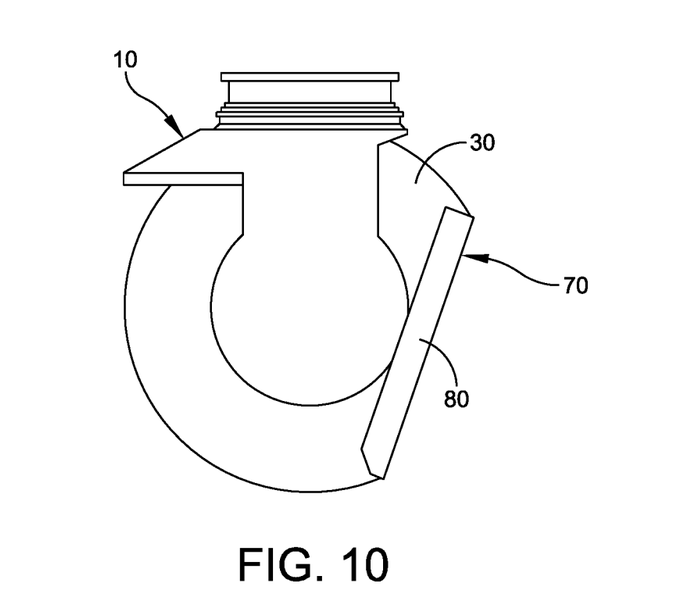
FIG. 10 is a perspective view of the air foil shown in FIGS. 7-9 is a partially rotated position (90°)

FIG. 8 illustrates the turret housing 10 looking forward at a 0° azimuth with a roll position of the air foil 70 being 0°. FIG. 9 illustrates the turret housing 10 looking forward at a 45° azimuth with a roll position of the air foil 70 being 45°. FIG. 10 illustrates the turret housing 10 looking forward at a 90° azimuth with a roll position of the air foil 70 being 90°. The air foil 70 is configured to rotate as required to provide optical performance of the optical instruments contained within the housing 10. When looking aft, the first and/or second reduced width portions 80, 82 may be positioned to reduce aero torque by eliminating a lip of the air foil 70 that produces high torque on the housing 10.

Figure 11:
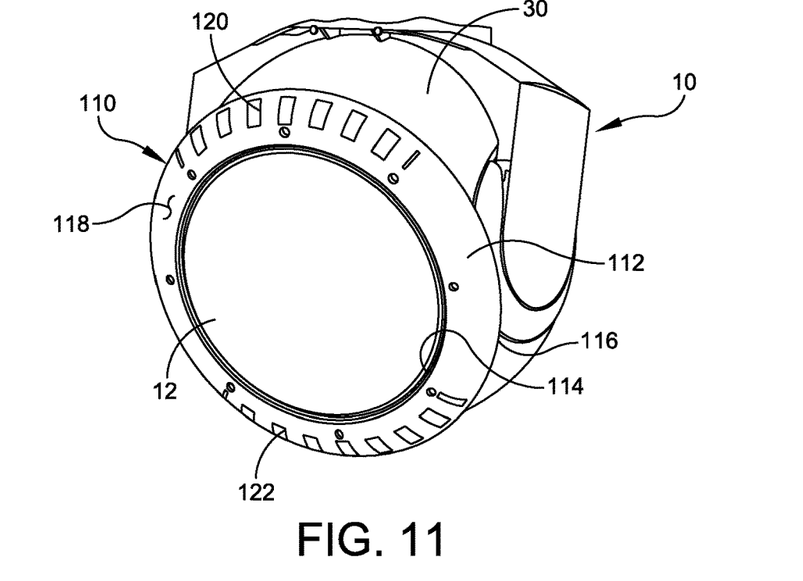
FIG. 11 is a perspective view of an air foil of another embodiment of the present disclosure, with slots of the air foil being closed.
Figure 12:
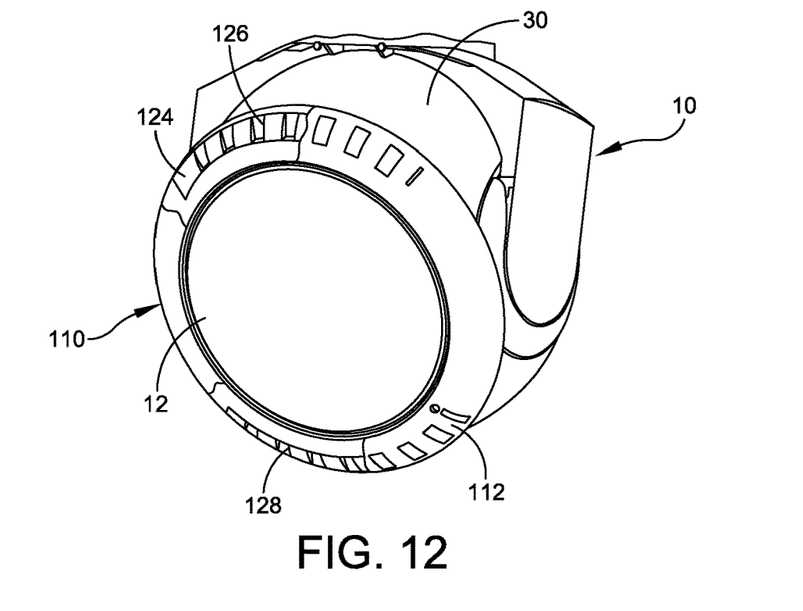
FIG. 12 is a perspective view of an air foil of another embodiment of the present disclosure, with slots of the air foil being opened.

Referring to FIGS. 11 and 12, and more particularly to FIG. 11, another air foil of embodiments of the present disclosure is generally indicated at 110. As with air foils 10, 40, 70 (of FIGS. 2-4, FIGS. 5 and 6 and FIGS. 7-10, respectively), air foil 110 is mounted on the spherical cover 30 of the housing 10 in a position that the air foil 110 surrounds the window 12 to control fluid flow over the window 12. The air foil 110 includes an annular body 112 having an inner peripheral edge 114 and an outer peripheral edge 116. The body 112 of the air foil 110 further includes an arcuate outer surface 118 disposed between the inner peripheral edge 114 and the outer peripheral edge 116. The air foil 110 further includes a first plurality of slots together indicated at 120 formed in the body 112 along a first portion of a circumference of the body 112. The air foil 110 further includes a second plurality of slots together indicated at 122 formed in the body 112 along a second portion of the circumference of the body 112. The second plurality of slots 122 is positioned on the body 112 of the air foil 110 at an opposite side of the body of the air foil 110 from the first plurality of slots 120. In a certain embodiment, the body 112 of the air foil is secured to the spherical cover 30 of the housing 10 by fasteners in a similar manner as the body 16 of the air foil 14.

Referring to FIG. 12, in a certain embodiment, the air foil 110 may include an insert 124 that is coupled to and rotatable with respect to the body 112. The insert 124 has a first plurality of slots 126 and a second plurality of slots 128, which when aligned with the first plurality of slots 120 and the second plurality of slots 122 of the body 112 create openings through which air flows. The insert 124 is configured to rotate so that the first and second pluralities of slots 120, 122 of the body 112 are covered, thereby preventing air from flowing through the air foil 110. FIG. 12 illustrates the first and second pluralities of slots 126, 128 of the insert 124 in an aligned relationship with the first and second pluralities of slots 120, 122 of the body 112 of the air foil 110 to create the openings thereby allowing air to flow through the body 112 of the air foil 110. It should be understood that the insert 124 of the air foil 110 can be rotated so that the first and second pluralities of slots 126, 128 are in an offset relationship with the first and second pluralities of slots 120, 122 of the body 112 of the air foil to create a closed, contiguous surface thereby closing the openings and preventing air from flowing through the air foil 110. In a certain embodiment, the air foil 110 further includes a mechanism configured to rotate the insert 124 with respect to the body 112 of the air foil 110.

Figure 13:
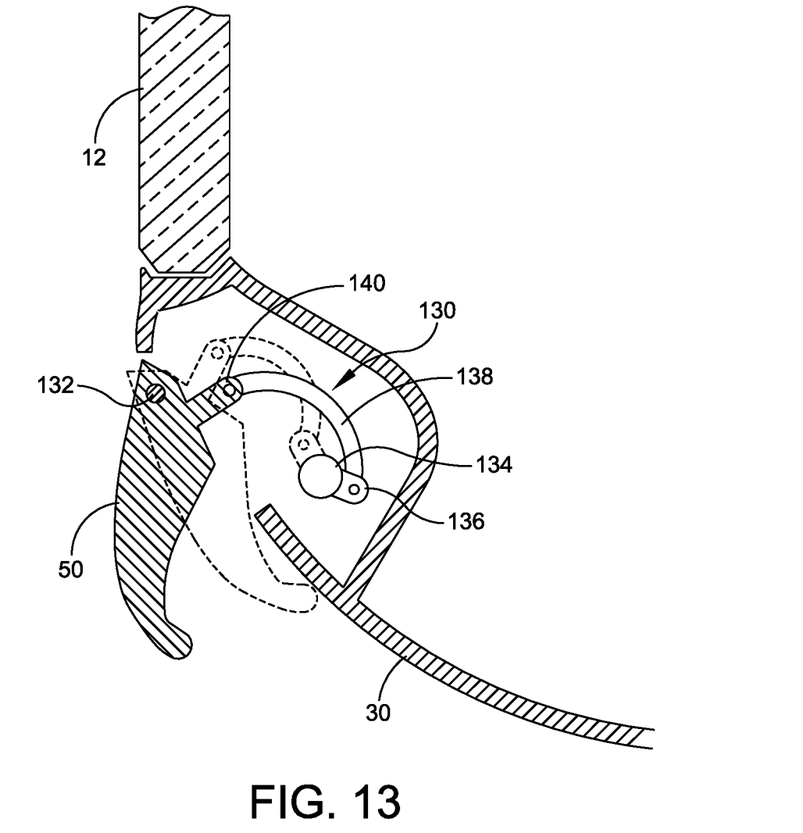
FIG. 13 is a cross-sectional view of a movement mechanism configured to move a portion of the air foil shown in FIGS. 5 and 6.

In some embodiments, movement mechanisms may be provided to move, rotate and/or manipulate certain aspects of the various embodiments of the air foil described herein. For example, FIG. 13 illustrates a movement mechanism, generally indicated at 130, configured to move the movable portion 50 with respect to the remainder of the body 42 of the air foil 40, which is described above with reference to FIGS. 5 and 6. As shown, the movable portion 50 is pivotally connected to the spherical cover 30 of the air foil 40 by a pivot hinge 132. In one embodiment, the movement mechanism 130 includes a motor assembly 134 having an integral motor, gearhead, and encoder assembly, which together are configured to drive the rotary motion of a crank 136. The crank 136 is connected to a drive link 138 that is pivotally coupled to a follower link 140 provided on the movable member 50. The arrangement is such that the movement mechanism 130 is capable of moving the movable member 50 between the first (deployed) position illustrated by solid lines in FIG. 13 and the second (stowed) position illustrated by broken lines in FIG. 13. As mentioned above, in the deployed position, the movable portion 50 is positioned to enable full optical performance, and in the stowed position, the movable portion is retracted toward the spherical cover 30 of the housing 10 to lower the elevation torque. Connecting the actuator (movement mechanism 130) to the body 42 of the airfoil 40 is one possible approach for implementing the actuator. Another approach is to have the actuator be part of the cover 30 and the linkage connection may be made during the attachment of the airfoil 40.

Figure 14:
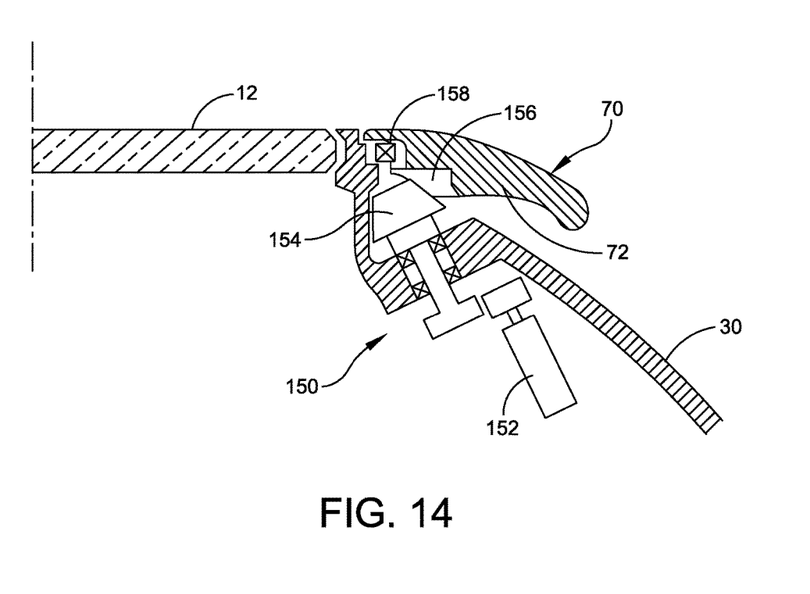
FIG. 14 is a cross-sectional view of a movement mechanism configured to rotate the air foil shown in FIGS. 7-10.

Referring to FIG. 14, a rotary movement mechanism, generally indicated at 150, is provided to rotate the air foil 70 with respect to the spherical cover 30 of the housing 10. As shown in FIGS. 7-10, the truncated air foil 70 can be rotated about the window 12 as required to improve optical performance for a wide range of viewing angles, and to minimize aerodynamic torque when looking aft. As mentioned above, the rotary movement mechanism 150 is configured to rotate the air foil 70 with respect to the spherical cover 30 of the housing 10 in a clockwise direction and/or a counterclockwise direction to a desired position. In one embodiment, the movement mechanism 150 includes a motor assembly 152 having an integral motor, gearhead, and encoder assembly, which together are configured to drive the rotary motion of a beveled gear 154. The beveled gear 154 is configured to drive a mating beveled gear 156 mounted on the body 72 of the air foil 70. The movement mechanism 150 further includes an x-contact ball bearing 158 to enable the relative rotary motion of the body 72 of the air foil 70 with respect to the spherical cover 30 of the housing 10. The air foil 70 is configured to rotate as required to provide optical performance of the optical instruments contained within the housing 10.

Figure 15A:
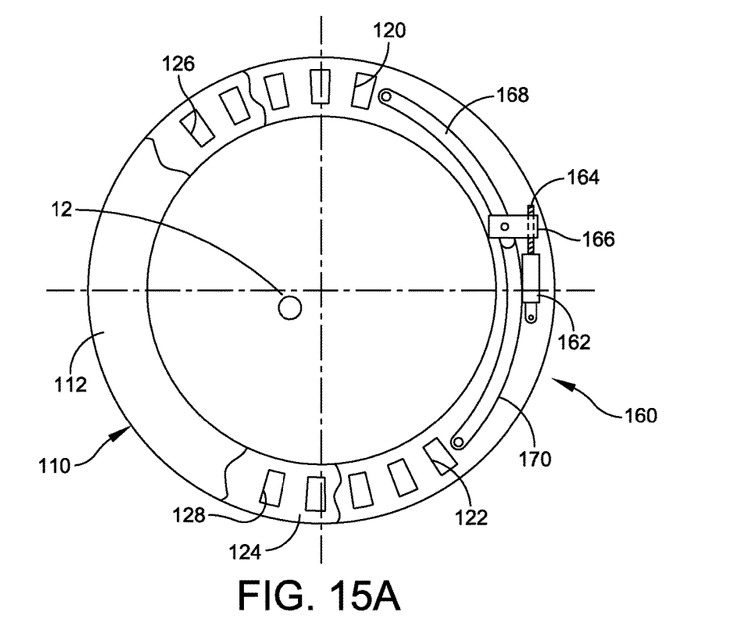
FIG. 15A is a front view of a movement mechanism configured to rotate an insert of the air foil shown in FIGS. 11 and 12.
Figure 15B:
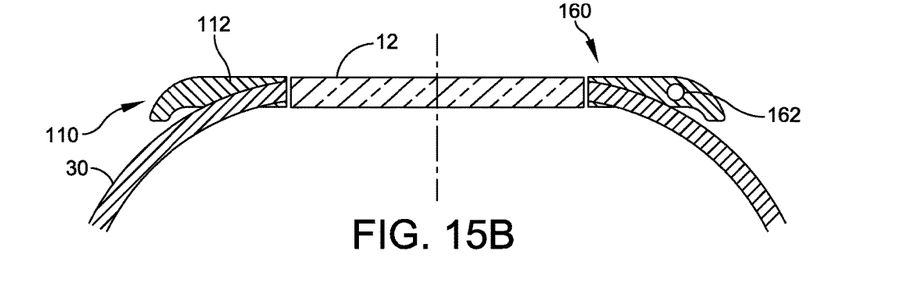
FIG. 15B is a cross-sectional view of the air foil shown in FIG. 15A.
Figure 15C:
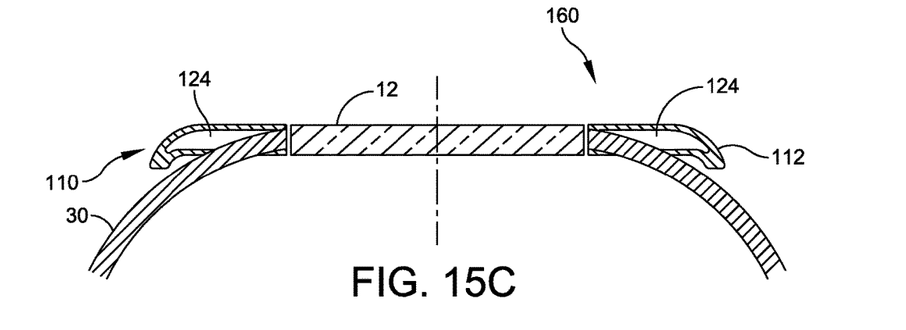
FIG. 15C is another cross-sectional view of the air foil shown in FIGS. 15A and 15B.

Referring to FIGS. 15A, 15B and 15C, another rotary movement mechanism, generally indicated at 160, is provided to rotate the insert 124 of the air foil 110 with respect to the body 112 of the air foil 110 (each shown in FIGS. 11 and 12). As shown in FIGS. 11 and 12, the slotted air foil 110 can be rotated about the window 12 as required to improve optical performance of the optical instrument. The rotary movement mechanism 160 is configured to rotate the insert 124 of the air foil 110 with respect to the body 112 of the air foil 110 in a clockwise direction and/or a counterclockwise direction to open and close the openings created by the alignment of slots 126, 128 of the insert 124 with slots 120, 122 of the body 112. In one embodiment, the movement mechanism 160 includes a rotary actuator 162, which is configured to drive the rotary motion of a lead screw 164. The lead screw 164 is positioned within a threaded nut 166, which is configured to drive the rotation of the insert 124 with respect to the body 112 of the air foil 110 along an upper linkage 168 and a lower linkage 170. Linear movement of the threaded nut 166 creates rotation of the insert 124 by the nature of a limited angular rotation. Minor angular misalignment is decoupled by pins provided at the ends of linkages 168 and 170. The insert 120 rotates by following shaped tracks with in the air foil 110.

In some embodiments, the air foil increases the high resolution imaging field of regard from azimuth +/−45 degrees and elevation +20 up to −80 down to +/−110 degrees azimuth with the same elevation. An optional addition to the air foil includes a moving section to reduce elevation aero load torque for certain look angles.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A device for controlling fluid flow over a window of a movable optical instrument housing, the device comprising:
    a generally annular body configured to be secured to the movable optical instrument housing, the annular body having an inner peripheral edge configured to correspond to the window of the movable optical instrument housing and an outer peripheral edge, an arcuate outer surface disposed between the inner peripheral edge and the outer peripheral edge, a first portion between the inner peripheral edge and the outer peripheral edge, and a second portion between the inner peripheral edge and the outer peripheral edge at an opposite side of the body; and
    a mechanism configured to rotate the device with respect to the housing.

2. The device of claim 1, wherein the inner peripheral edge is generally circular in shape and the outer peripheral edge is generally circular in shape.

3. The device of claim 2, the portion includes a chord edge that defines a portion of the outer peripheral edge.

4. The device of claim 1, wherein the mechanism includes a motor assembly configured to drive a gear associated with the device.

5. The device of claim 1, wherein the inner peripheral edge is configured to be substantially flush and contiguous with an outer portion of the window when the device is coupled with the housing.

6. A device for controlling fluid flow over a window of a movable optical instrument housing, the device comprising:
    a generally annular body configured to be secured to the movable optical instrument housing, the annular body having an inner peripheral edge configured to correspond to the window of the movable optical instrument housing and an outer peripheral edge, an arcuate outer surface disposed between the inner peripheral edge and the outer peripheral edge, and a movable portion positioned adjacent the outer peripheral edge, the movable portion being configured to move with respect to a remainder of the body.

7. The device of claim 6, wherein the movable portion is pivotally movable from a first position in which the movable portion forms a contiguous surface with the remainder of the body and a second position in which the movable portion is moved toward the housing.

8. The device of claim 7, further comprising a mechanism configured to move the movable portion between the first position and the second position.

9. The device of claim 8, wherein the mechanism includes a motor assembly configured to rotate a crank coupled to the movable portion to drive the pivotal movement of the movable portion.

10. A device for controlling fluid flow over a window of a movable optical instrument housing, the device comprising:
    a generally annular body configured to be secured to the movable optical instrument housing having an inner peripheral edge configured to correspond to the window of the movable optical instrument housing and an outer peripheral edge, an arcuate outer surface disposed between the inner peripheral edge and the outer peripheral edge, and a plurality of slots formed along a portion of a circumference of the body.

11. The device of claim 10, wherein the plurality of slots constitutes a first plurality of slots at one side of the body of the device, and wherein the body includes a second plurality of slots at an opposite side of the body of the device.

12. A method for controlling fluid flow over a window of an optical instrument housing on a vehicle, the method comprising:
    securing a device around the window of the housing, the device including a generally annular body having an inner peripheral edge configured to correspond to a peripheral edge of the window of the housing and an outer peripheral edge, an arcuate outer surface disposed between the inner peripheral edge and the outer peripheral edge, and a portion between the inner peripheral edge and the outer peripheral edge, the portion being configured to lower elevation torque,
    wherein the portion constitutes a first portion at one side of the device, the device further comprising a second portion between the inner peripheral edge and the outer peripheral edge at an opposite side of the device, and wherein the method further comprises rotating the device with respect to the housing.

13. A method for controlling fluid flow over a window of an optical instrument housing on a vehicle, the method comprising:
    securing a device around the window of the housing, the device including a generally annular body having an inner peripheral edge configured to correspond to a peripheral edge of the window of the housing and an outer peripheral edge, an arcuate outer surface disposed between the inner peripheral edge and the outer peripheral edge, and a movable portion positioned adjacent the outer peripheral edge, the movable portion being configured to move with respect to a remainder of the body; and
    pivotally moving the movable portion from a first position in which the movable portion forms a contiguous surface with the remainder of the body and a second position in which the movable portion is moved toward the housing to reduce aerodynamic torque.

14. A method for controlling fluid flow over a window of an optical instrument housing on a vehicle, the method comprising:
    securing a device around the window of the housing, the device including a generally annular body having an inner peripheral edge configured to correspond to a peripheral edge of the window of the housing and an outer peripheral edge, an arcuate outer surface disposed between the inner peripheral edge and the outer peripheral edge, and a plurality of slots formed along a portion of a circumference of the body.

15. The method of claim 14, wherein the plurality of slots constitutes a first plurality of slots at one side of the body of the device, and wherein the body includes a second plurality of slots at an opposite side of the body of the device.

16. The method of claim 15, further comprising rotating a mechanism configured to rotate an insert of the device with respect to the housing to open the first plurality of slots and the second plurality of slots.

* * * * *